C. D. Palmiter,
Friction Clutch Pulley.
N° 70,888.   Patented Nov. 12, 1867.
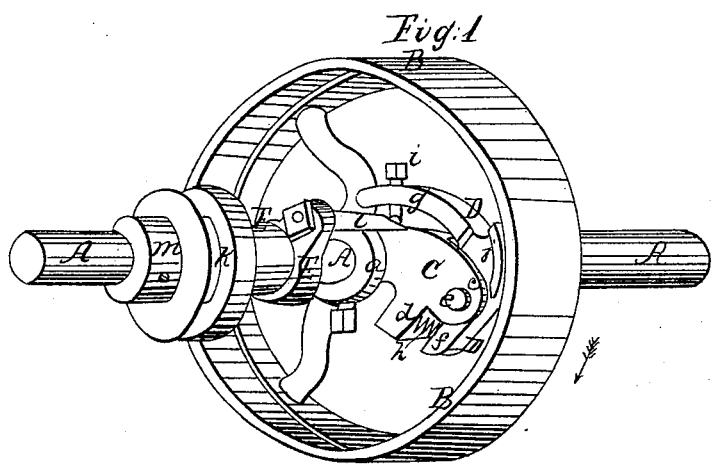
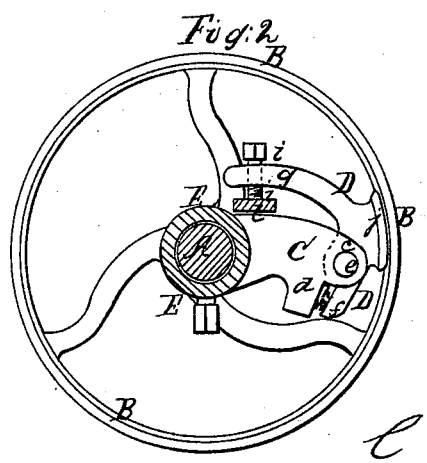
Witnesses
Thos Inshe
Wm Trewrn
Inventor
C D Palmiter
Per Munn & Co
Attorneys

United States Patent Office.

C. D. PALMITER, OF OSWEGO, NEW YORK, ASSIGNOR TO S. A. WEBB, OF THE SAME PLACE.

Letters Patent No. 70,888, dated November 12, 1867.

IMPROVEMENT IN FRICTION CLUTCH-PULLEY.

*The Schedule referred to in these Letters Patent and making part of the same.*

TO ALL TO WHOM IT MAY CONCERN:

Be it known that I, C. D. PALMITER, of Oswego, in the county of Oswego, and State of New York, have invented a new and improved Friction Clutch and Pulley; and I do hereby declare that the following is a full, clear, and exact description thereof, which will enable others skilled in the art to make and use the same, reference being had to the accompanying drawings, forming part of this specification, in which—

Figure 1 represents a perspective view of my invention.
Figure 2 is a side view of the same.
Similar letters of reference indicate like parts.

This invention consists in the employment of a pulley, fitting loosely upon a shaft, and driven by a belt from any suitable power, in combination with an elbow-shaped friction-lever, which is pivoted to an arm projecting from the shaft, and which is operated by a wedge, secured to a sliding sleeve, so that a friction-pad, that is secured to the friction-lever, may, by the said wedge, be pressed against the inner circumference of the pulley-rim, thereby connecting the pulley with the sleeve and shaft, and driving the latter.

A represents a shaft, on which a pulley, B, of ordinary construction, is hung, so as to turn loose thereon, shoulders $a$ $a$ being formed on the shaft, on either side of the pulley, to prevent the latter from sliding on the shaft.

C is an arm, firmly secured to and projecting from the shaft A, and arranged within the pulley, as shown. It is provided with two ears or lugs, $c$ $c$, at its extreme end, and with an arm, $d$, projecting from one side towards the rim of the pulley.

By means of a pin, $e$, an elbow-shaped bar, D, is pivoted to the arm C, the said pin $e$ passing through the ears $c$ and the outer arm $f$ of the bar D, near to its joint with the other arm $g$ of the latter. The arm $f$ of the bar D is thus held outside and parallel with the arm $d$, while the arm $g$ is curved, and is held close to and parallel with the curved side of the arm C, as is clearly shown in the drawing. A spiral spring, $h$, arranged between the ends of the arms $f$ and $d$, tends to force the end of the arm $g$ against the arm C. A set-screw, $i$, arranged in the end of the arm $g$, prevents the end of the latter from being pressed close against the arm D, and regulates the distance between the same. $j$ is a friction-pad, attached to and projecting from the bar D, being arranged at the joint of the arms $f$ and $g$, and out of line with the axis A and $e$, as is clearly shown in the drawing.

E is a sleeve sliding loose on the shaft A, and moved on the same by a bifurcated lever fitting into a groove, $k$, that is provided in the latter, or otherwise. A wedge-shaped plate, $l$, is secured to and projects from this sliding sleeve, and its thin end is kept between the end of the set-screw $i$ and the arm C, so that thereby the sleeve is always connected with the arm C, and will thus revolve with the shaft A at all times. A fixed collar, $m$, arranged on the shaft, prevents the wedge from being withdrawn from the arm altogether.

By sliding the sleeve towards the arm C, the thicker part of the wedge will gradually be forced between the set-screw $i$ and the arm C, and thereby the end of the arm $f$ will be moved towards the arm $d$, while the pad $j$ will be forced against the rim of the pulley. When now the pulley is turned in the direction of the arrow 1, in fig. 1, it will have the tendency to bring the clamping-edge of the pad $j$ in line with the axis A and $e$, thereby making the arm C and pad $j$ act like toggle-bars, and, increasing the bite of the pad $j$, the more the pulley is turned, the shaft A will then be revolved; but when the pulley is turned in the opposite direction, it will carry the pad still more out of line with the axis A and $e$, and thereby the pressure of the pad will be lessened, so that the pulley will still turn loose on the shaft, or the latter in the pulley, as the case may be. For circular-saw mills this arrangement is of special value. By means of the set-screw $i$ the bite of the pad may be regulated at pleasure.

In fig. 1 the pulley is represented as being thrown out of gear, the sleeve E being moved towards the collar $m$.

In fig. 2 the wedge is represented as being inserted between $i$ and C, and the pad thrown against the pulley. As soon as the sleeve is moved back towards the collar $m$, the spring $h$ will throw the end of the arm $f$ up again, and will disengage the pad $j$ from the rim of the pulley.

This device may be doubled or trebled in any one pulley, so as not to strain its rim, and to insure more perfect operation. In that case, but one sleeve, E, is used, and the required number of wedges secured to the same.

What I claim as new, and desire to secure by Letters Patent, is—

1. The device, herein shown and described, of connecting the pulley B with the shaft A, consisting of a movable wedge, $l$, and an eccentric pivoted friction-pad, $j$, which are made and operated substantially in the manner herein shown and described.

2. The hinged lever D, spring $h$, stationary arm C, and sliding wedge $l$, in combination with each other and with the shaft A and pulley B, all made and operating substantially as herein shown and described.

3. The combination and arrangement of the arm C, having arm $d$, elbow-shaped bar D pivoted thereto, and having the arms $f$ $g$ and pad $j$, spring $h$, set-screw $i$, wedge $l$, sliding sleeve E, pulley B, and shaft A, as herein described, for the purpose specified.

4. The pad $j$, when attached to the arm D at the point of connection of the arm $f$ $g$, and out of line with the axis A $e$, whereby the revolutions of the pulley B in one direction clamps the edge of the pad in line with the axis A $e$, and increases its bite, and the revolutions of the pulley in the opposite direction turn the pad out of the line of said axis, and releases its bite, as herein described for the purpose specified.

C. D. PALMITER.

Witnesses:
    CHAS. WEBB,
    C. W. McELROY.